United States Patent [19]

Hayashi

[11] Patent Number: 4,598,681
[45] Date of Patent: Jul. 8, 1986

[54] AUTOMOTIVE ENGINE WITH KNOCK SENSOR

[75] Inventor: Yoshimasa Hayashi, Kamakura, Japan

[73] Assignee: Nissan Motor Co., Ltd., Yokohama, Japan

[21] Appl. No.: 714,358

[22] Filed: Mar. 22, 1985

Related U.S. Application Data

[63] Continuation of Ser. No. 411,048, Aug. 24, 1982, abandoned.

[30] Foreign Application Priority Data

Aug. 26, 1981 [JP] Japan .................. 56-132568

[51] Int. Cl.⁴ ............... F02P 17/00; G01L 23/22
[52] U.S. Cl. ........................... 123/425; 73/35
[58] Field of Search ........... 123/425, 435, 195 R; 73/35

[56] References Cited

U.S. PATENT DOCUMENTS 4,153,020 5/1979 King et al. .................. 73/35 X
4,412,514 11/1983 Hayakawa et al. ........ 123/195 H X

FOREIGN PATENT DOCUMENTS 2903788 8/1980 Fed. Rep. of Germany .
2952073 6/1981 Fed. Rep. of Germany .
472638 5/1947 France .

OTHER PUBLICATIONS

M. P. Fontanet, "Influence du Spectre de la Pression de Combustion", 1141 Ingenieurs de l'Automobile, No. 5/6, Jun. 1978.

Primary Examiner—Tony M. Argenbright
Attorney, Agent, or Firm—Schwartz, Jeffery, Schwaab, Mack, Blumenthal & Evans

[57] ABSTRACT

An automotive internal combustion engine comprises a cylinder block having at its bottom part with a plurality of main bearings, a bearing beam structure secured to the bottom part of the cylinder block and including a plurality of main bearing cap sections each of which associates with each main bearing of the cylinder block to rotatably support a crankshaft, and at least a beam section for securely connecting the bearing cap sections with each other, and an engine knock sensor for detecting engine knock and located at a part of the bearing beam structure, thereby sensitively detecting engine knock while effectively reducing engine noise.

7 Claims, 3 Drawing Figures

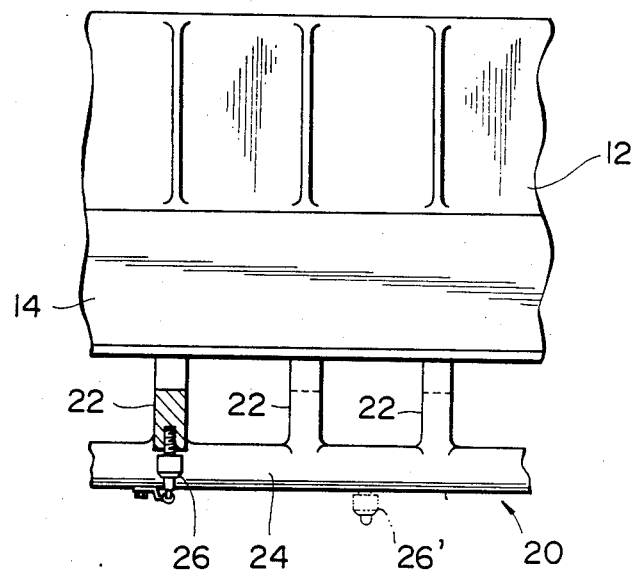

AUTOMOTIVE ENGINE WITH KNOCK SENSOR

This application is a continuation, of application Ser. No. 411,048, filed 08/24/82, now abandoned.

BACKGROUND OF THE INVENTION

1. Field of the Invention

This invention relates, in general, to an improvement in an automotive internal combustion engine, and more particularly to an installation location of an engine knock sensor for detecting engine knock developed in engine cylinders in order to effectively control engine operating conditions such as spark timing of the engine.

2. Description of the Prior Art

In connection with engine knock sensors for detecting engine knock developed in engine cylinders, they are usually located at the outer wall of a cylinder block. However, the thus located knock sensors cannot effectively detect the engine knock with a high precision because vibration due to engine knock in the engine cylinders tends to be damped during its transmission through the cylinder block. This has rendered impossible a high precision control of engine operation condition in response to the output of the knock sensors.

SUMMARY OF THE INVENTION

An internal combustion engine according to the present invention comprises a cylinder block having a bottom part with a plurality of main bearings. A bearing beam structure is secured to the bottom part of the cylinder block and includes a plurality of main bearing cap sections each of which associates with a main bearing of the cylinder block, and at least a beam section for securely connecting all the bearing cap sections with each other. Additionally, an engine knock sensor for detecting engine knock is located on a part of the bearing beam structure, for example, on a part of one of the bearing cap sections. With the thus arranged engine, engine knock detection can be achieved with a high precision even when engine knock develops in any engine cylinders, while effectively reducing engine noise.

BRIEF DESCRIPTION OF THE DRAWINGS

The features and advantages of the internal combustion engine according to the present invention will be more fully appreciated from the following description taken in conjunction with the accompanying drawings in which the same reference numerals designate the same parts and elements, in which:

FIG. 3 is a fragmentary side elevation of the engine of FIG. 2.

DETAILED DESCRIPTION OF THE INVENTION

Figure 1:
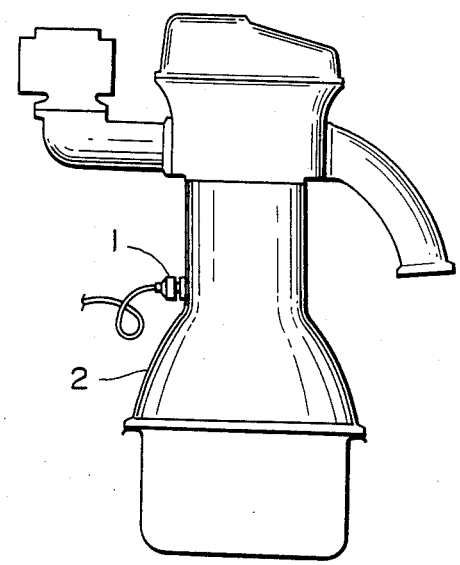
FIG. 1 is a schematic front elevation of a conventional internal combustion engine provided with an engine knock sensor.

Referring to FIG. 1, a conventional automotive internal combustion engine will be described along with its major shortcomings. In such an engine, an engine knock sensor 1 is installed at the outer wall of a water jacket, and the location of the knock sensor 1 is selected at a generally middle section in the direction along which the engine cylinders are aligned. Accordingly, the engine knock sensor senses vibration at the surface of a cylinder block or the water jacket outer wall, thereby indirectly detecting engine knock developed in the engine cylinders. The thus detected engine knock is picked up as an electric signal and is used for controlling the operating conditions of the engine.

However, the thus located engine knock sensor has encountered the following shortcomings: In general, when engine knock is generated in the engine cylinders, vibrations at frequencies around 7 KHz or 13 KHz develop, which frequencies are different with different size engines. In this connection, such vibrations due to engine knock are considerably damped during their transmission or propagation through the cylinder block of a complicated structure. The degree of such vibration damping becomes higher as the distance of vibration transmission through the cylinder block increases. Therefore, engine knock in the engine cylinder located relatively near the knock sensor 1 can be precisely detected; however, it is difficult to detect precisely engine knock generated within the engine cylinder located relatively far from the knock sensor 1.

Figure 2:
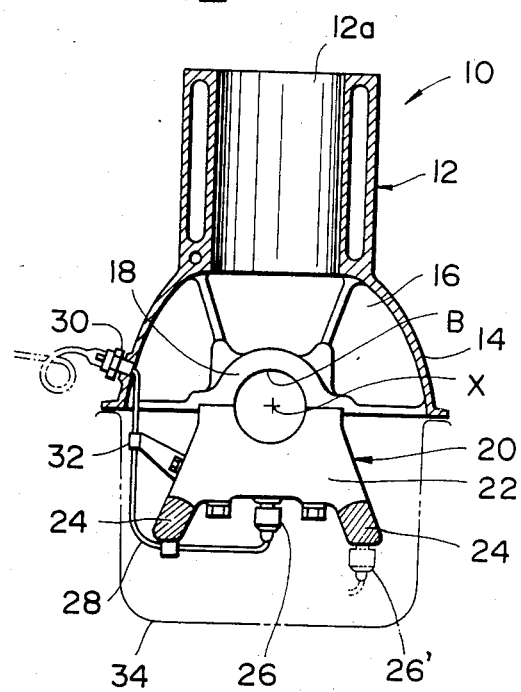
FIG. 2 is a vertical section view of a preferred embodiment of an internal combustion engine in accordance with the present invention.

In view of the above description of the conventional automotive internal combustion engine provided with the engine knock sensor, reference is now made to FIGS. 2 and 3 of the drawings, wherein a preferred embodiment of an automotive internal combustion engine of the present invention is illustrated by the reference numeral 10. The engine 10 comprises a cylinder block 12 which is, as usual, formed with a plurality of engine cylinders 12a each defining therein a cylinder bore. The cylinder block 12 is further formed at its lower part with a so-called skirt section 14 which is integral with the engine cylinders 12a and bulged outwardly to define thereinside an upper part of a crankcase. A plurality of parallel disposed main bearing bulkheads 16 are formed integrally with the engine cylinders 12a and with the skirt section 14. Each bearing bulkhead 16 is located below the cylinder barrels 12a and integrally connected to a portion between two neighboring engine cylinders 12a. Each bearing bulkhead 16 is formed with a main bearing 18 for rotatably supporting the journal of a crankshaft whose axis is indicated by the character X.

A bearing beam structure 20 is securely connected to the bottom part of the cylinder block 12 by means of bolts, and includes a plurality of main bearing cap sections 22. Each bearing cap section 22 is rigidly attached to a main bearing bulkhead 16 so that the bearing cap section 22 defines a bore B, in which the crankshaft is disposed, in association with the corresponding main bearing 18 of the bearing bulkhead 16. The bearing cap sections 22 are integrally connected by two beam sections or members 24 which are located parallel with each other and extend along the axis X of the crankshaft. The two beam sections 24 are positioned at the bottom opposite corners of each bearing cap section 22, respectively. Therefore, the thus formed bearing beam structure 20 functions to suppress fore-and-aft direction movement, due to crankshaft vibration, of the main bearings 18, thereby reducing vibration of cylinder block 12. While the bearing cap sections 22 and the beam sections 24 are shown and described as being integral with each other in this embodiment, it will be understood that they (22, 24) may be independent from each other and fastened to each other by means of bolts or the like.

Additionally, an engine knock sensor 26 for sensing vibration due to engine knock is so disposed that a part thereof is embedded in one of the bearing cap sections 22. The engine knock sensor 26 is fixed in position by means of screws or the like and electrically connected via a lead 28 to a pickup 30 which is secured to the cylinder block skirt section 14. The lead 28 is supported by a clamp 32. Thus, the output of the knock sensor 26 is supplied to a controller (not shown) for controlling engine operating conditions in response to engine knock generated in the engine cylinders 12a. The reference numeral 34 denotes an oil pan fixedly attached to the cylinder block skirt section 14.

With the above discussed arrangement, when engine knock is generated in the engine cylinders, high frequency vibration due to the engine knock develops and is transmitted via pistons (not shown), connecting rods (not shown), and the crankshaft to the main bearing 18 and the bearing cap sections 22 so as to be sensed by the knock sensor 26. Now, in case where engine knock is generated in the engine cylinder located far from the knock sensor 26, the main bearings 18 and the bearings cap sections 22 between which such the engine cylinder is interposed largely vibrate as compared with the other main bearings and bearing cap sections. The thus developed vibration is immediately transmitted to the bearing cap section at which the knock sensor 26 is located. Therefore, engine knock can be effectively detected even if it is generated at any engine cylinders 12a.

It is preferable that the natural frequency of the beam section 24 of the bearing beam structure 20 is set at a value the same as the frequency of high frequency vibration due to engine knock. For example, the frequency of beam section 24 could be set at a value in the vicinity of 7 KHz, in which resonance vibration will occur in the beam sections 24 even when engine knock is generated in any engine cylinders, thereby more sensitively detecting engine knock.

While the knock sensor 26 has been shown and described as being installed at the bearing cap section 22 of the bearing beam structure 10, it will be understood that it may be installed at the beam section 24 as indicated in phantom and by the reference numeral 26' in FIGS. 2 and 3, in which position engine knock also can be sensitively detected.

As appreciated from the above, according to the present invention, since the bearing cap sections for supporting the crankshaft are securely connected with each other by means of the beam sections, vibration of the main bearings 18 in the fore-and-aft direction can be largely suppressed, thereby effectively reducing cylinder block vibration. Besides, the engine knock sensor is installed at the beam section of the bearing beam structure or at the bearing cap section directly connected to the beam section, and accordingly the propagation path of high frequency vibration, due to engine knock, from the engine cylinder to the knock sensor is simplified, thereby enabling sensitive detection of engine knock. Therefore, it is possible to largely advance spark timing to an engine knock limit above which engine knock tends to occur, in response to the output of the knock sensor, thereby improving fuel economy, power output, driveability of the engine, while reducing noise emitted from the engine.

What is claimed is:

1. An automotive internal combustion engine comprising:
   a cylinder block having a bottom part with a plurality of main bearings;
   a bearing beam structure secured to the bottom part of said cylinder block and including a plurality of main bearing cap sections which associate with said main bearings of said cylinder block to rotatably support a crankshaft, and at least one beam section for securely connecting said bearing cap sections with each other; and
   an engine knock sensor for detecting engine knock, said knock sensor being located on a part of said bearing beam structure.

2. An automotive internal combustion engine as claimed in claim 1, wherein said knock sensor is located on one of said bearing cap sections.

3. An automotive internal combustion engine as claimed in claim 1, wherein said knock sensor is located on said beam section.

4. An automotive internal combustion engine as claimed in claim 1, wherein said at least one beam section includes first and second beam sections which are parallel with and spaced from each other, and extend along the axis of the crankshaft, said first and second beam sections being located respectively at the bottom opposite corners of each bearing cap sections.

5. An automotive internal combustion engine as claimed in claim 1, further wherein the natural frequency of said bearing beam structure beam section is the same as a frequency of vibration generated by engine knock.

6. An automotive internal combustion engine as claimed in claim 5, wherein the natural frequency of said bearing beam structure beam section is about 7 KHz.

7. An automotive internal combustion engine, comprising:
   a cylinder block having a plurality of main bearing sections;
   a bearing beam structure secured to said cylinder block and including a plurality of main bearing cap sections associated, respectively, with said main bearing section of said cylinder block to rotatably support a crankshaft, and at least one beam section connected to each of said main bearing cap sections for reinforcing said main bearing cap sections and channeling vibrations received at any of said main bearing cap sections there along, wherein said cylinder block includes a plurality of cylinders which may generate engine knock in a predetermined frequency range, and wherein said beam section has a natural frequency of vibration which is the same as the frequency of vibration generated by said engine knock so as to maximize the vibration transmitting qualities of said beam section in said predetermined frequency range; and
   a single engine knock sensor for detecting engine knock in all of said engine cylinders, said knock sensor being located on said bearing beam structure and positioned to receive vibrations from any of said engine cylinders channeled through said beam section, whereby said knock sensor may sense engine knock both at cylinders close to the position of said knock sensor and in cylinders positioned at a great distance from said knock sensor.

* * * * *